United States Patent [19]

Shutt

[11] 4,078,384
[45] Mar. 14, 1978

[54] THREE FUNCTION MASTER CYLINDER
[75] Inventor: Paul B. Shutt, St. Joseph, Mich.
[73] Assignee: The Bendix Corporation, South Bend, Ind.
[21] Appl. No.: 644,227
[22] Filed: Dec. 24, 1975
[51] Int. Cl.² ............................................. F15B 7/00
[52] U.S. Cl. ...................................... 60/535; 60/545; 60/561; 60/562; 60/582; 60/591
[58] Field of Search ................ 60/534, 562, 545, 546, 60/582, 588, 591, 561, 535, 577; 91/372

[56] References Cited
U.S. PATENT DOCUMENTS

| | | | |
|---|---|---|---|
| 3,415,060 | 12/1968 | Belart | 60/561 |
| 3,416,315 | 12/1968 | Wortz | 60/535 |
| 3,677,606 | 7/1972 | Shutt | 60/562 |
| 3,686,864 | 8/1972 | Shutt | 60/561 |

Primary Examiner—Martin P. Schwadron
Assistant Examiner—Abraham Hershkovitz
Attorney, Agent, or Firm—Leo H. McCormick, Jr.; William N. Antonis

[57] ABSTRACT

A fluid motor having a housing with a stepped bore for retaining a first piston and a second piston. A sleeve is located in the stepped bore to permit the first piston and the second piston to be of substantially the same diameter. A plug attached to the housing holds the sleeve in the stepped bore. A spring attached to the sleeve holds the first piston against a stop. The spring acts on the sleeve to create a gap with a shoulder in the stepped bore. The second piston which is connected to the first piston through a linkage mechanism carries a concentric shuttle piston. The shuttle piston is subjected to a first hydraulic pressure created by the first piston and to a second hydraulic pressure created by the second piston. An indicator is connected to the shuttle piston and remains inactive when the first and second hydraulic pressures are substantially equal. However, whenever the second hydraulic pressure moves the second piston against the sleeve sufficiently to close the gap, the shuttle piston moves to generate a signal which actuates the indicator to inform the operator of such a condition.

12 Claims, 3 Drawing Figures

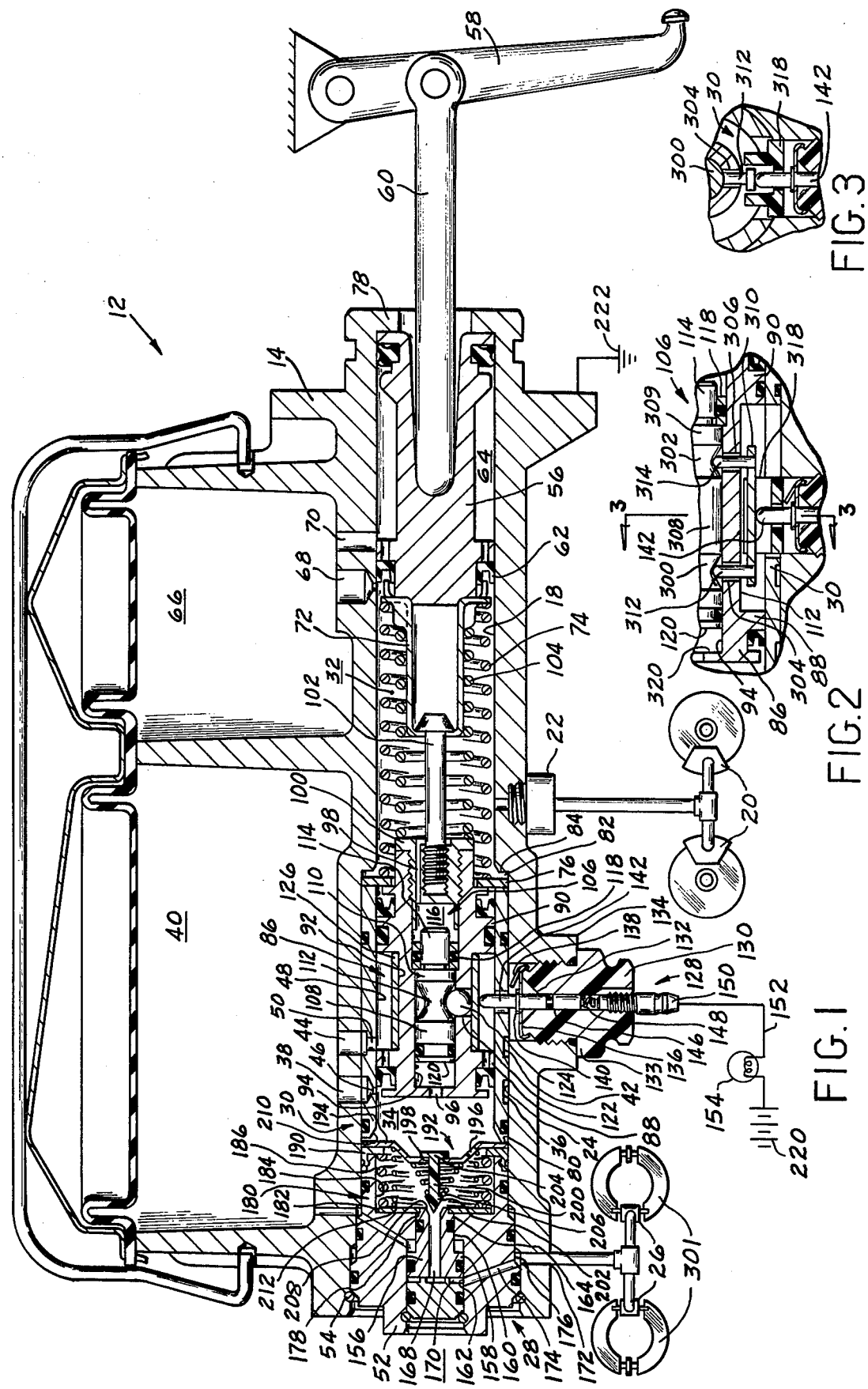

THREE FUNCTION MASTER CYLINDER

BACKGROUND OF THE INVENTION

In my earlier U.S. Pat. No. 3,686,864, I disclosed a braking system having a master cylinder which incorporates a warning failure switch, a proportioning valve and a metering valve. Through this master cylinder it is possible to achieve simultaneous actuation of disc brakes on the front wheels of a vehicle and drum brakes on the rear wheels of a vehicle. To bypass the proportioning valve, a shuttle valve is required to move a first lever which in turn moves a second lever. The second lever opens a poppet to allow the entire hydraulic fluid force developed by a second piston to be communicated to the rear wheels whenever a malfunction occurs in the front braking system. This type of lever actuation system, while functionally adequate for engineering laboratory testing, has not been successfully adapted to production manufacturing.

SUMMARY OF THE INVENTION

In an effort to achieve simplicity, I have devised a new master cylinder incorporating therein the desired functions of proportioning, metering and failure warning which substantially achieves a uniform brake actuation between front wheel disc brakes and rear wheel drum brakes. In this master cylinder, the operational bore has a first diameter and a second diameter separated by a shoulder. A sleeve means is retained in the second diameter by a plug means attached to the housing of the master cylinder. The interior of the sleeve means provides a substantially uniform bore with the first diameter. A first piston is located in the first diameter and a second piston is located in the interior of the sleeve means. A first resilient means connected to the sleeve means holds the first piston against a stop in the master cylinder housing. The first resilient means acts on the sleeve means to create a gap between the end of the sleeve means and the shoulder. A shuttle piston means concentrically carried by the second piston has a first surface which receives a first hydraulic pressure developed by the first piston and a second surface which receives a second hydraulic pressure developed by the second piston. An operator input force moves the first piston to develop the first hydraulic pressure. A spring and the first hydraulic pressure moves the second piston. The first hydraulic pressure is communicated to the front wheel brakes. However, a hold-off means delays the communication of the first hydraulic pressure until the second hydraulic pressure developed by the second piston means reaches a predetermined pressure level sufficient to actuate the drum brakes. At this time, the first hydraulic pressure operates the front wheel disc brakes. As long as the first hydraulic pressure and the second hydraulic pressure remain substantially equal, the shuttle piston remains stationary in the second piston.

Normally, a flow control means proportionally reduces the second fluid pressure communicated to the rear wheel drum brakes when the second fluid pressure attains a predetermined level. However, if the second hydraulic pressure exceeds the first hydraulic pressure by a predetermined amount, the sleeve means moves to close the gap and the second hydraulic pressure is communicated to the rear wheel brakes without being modified by the flow control means. At the same time, the shuttle piston moves to operate a switch which closes an electrical circuit which informs an operator of this malfunction.

It is, therefore, an object of this invention to provide a master cylinder which controls communication of hydraulic fluid to the front wheel disc brakes in synchronization with communication of hydraulic fluid to the rear wheel drum brakes and which indicates a malfunction of the braking system through actuation of a failure warning device by movement of a pressure differential responsive shuttle piston.

It is another object of this invention to provide a stepped bore master cylinder with a sleeve means to permit substantially equal diameter first piston means and second piston means to develop a first hydraulic fluid pressure and a second hydraulic pressure respectively for distribution to rear wheel drum brakes and front wheel disc brakes in a vehicle.

It is another object of this invention to provide a stepped bore master cylinder with resilient means cooperating with sleeve means to hold a first piston means against a stop. A linkage attached to the first piston positions a second piston within the sleeve means to permit substantially equal pressures to be developed in the master cylinder for distribution to the front and rear wheel brakes. If a pressure differential occurs between the pressures developed for the front and rear wheel brakes, the sleeve means moves and allows the full value of the fluid pressure developed by the second piston to be directly communicated to the rear wheel brakes.

These and other objects will become apparent from reading this specification and viewing the drawing.

BRIEF DESCRIPTION OF THE DRAWING

FIG. 1 is a schematic view of a braking system showing a sectional view of a master cylinder made pursuant to the teachings of my present invention;

FIG. 2 is a partial sectional view of a secondary actuator used with a failure warning switch for the master cylinder of FIG. 1; and FIG. 3 is a view taken along line 2—2 of FIG. 2.

DETAILED DESCRIPTION OF THE PREFERRED EMBODIMENT

In FIG. 1, a master cylinder means 12 has a housing 14 with a stepped bore having a first diameter section 18 connected to the front wheel brakes 20 through a hold-off means 22 of a type fully described in U.S. Pat. No. 3,677,606. The stepped bore of the master cylinder means 12 further includes a second diameter section 24 connected to the rear wheel brakes 26 through a flow control means 28.

A sleeve means 30 is located in the second diameter section 24. The inner diameter of the sleeve means 30 is equal to the first diameter section 18 so that the effective diameter of a first chamber 32 is extended into a second chamber 34. The sleeve means 30 has a first groove 36 aligned with compensator port 38 of the reservoir 40 and a second groove 42 aligned with a relief port 44. A first plurality of openings 46 and a second plurality of openings 50, respectively, connect the first groove 36 and the second groove 42 with the inner diameter 48 of the sleeve means 30.

A plug means 52 positioned in the second diameter section 24 seals the bore 16 from the atmosphere. The plug means 52 is secured in the housing 14 by a snap ring fastener 54.

A first piston means 56 located in the first diameter section 18 is connected to an operational input pedal 58 through a push rod 60. A seal 62 is located on the first piston means 56 to prevent communication of hydraulic fluid from chamber 32 into a relief chamber 64. Chamber 32 is connected to reservoir 66 through compensator port 68 while relief chamber 64 is connected to the reservoir 66 through relief port 70. A spring retainer 72 is attached to the end of the first piston means 56. A return spring or resilient means 74 positioned between a projection or washer 76 associated with the end of the sleeve means 30 and the spring retainer 72 urges the first piston means 56 against a stop 78 on the housing 14 and also urges the end 80 of sleeve 30 toward the plug means 52 to create a gap 82 between shoulder 84 and the washer 76.

A second piston means 86 located in the sleeve means 30 has a first land 88 separated from a second land 90 by a groove 92. The second piston means has an axial bore 94 with a passage 96 connected to the second chamber 34 and a passage 98 connected to the first chamber 32. The passage 98 is located in connector 100 to which bolt 102 links the first piston means 56 with the second piston means 86. A spring 104 is caged between the first piston means 56 and the second piston means 86. The caging bolt 102 is secured to the connector 100 to provide a means through which force is transmitted to operate the second piston means 86.

A shuttle piston means 106 located in the axial bore 94 has a first cylindrical section 108 and a second cylindrical section 110 separated by a groove 112. A small diameter projection 114 extends the second cylindrical section 110 into a return chamber 116 which has a larger diameter than the axial bore 94. A band and seal means 118 surrounds the small diameter section 114 to prevent communication between the return chamber 116 which receives the first hydraulic fluid pressure through passage 98 and the second hydraulic fluid pressure presented to end 120 of the shuttle piston means 106.

The piston piston means 86 has a radial bore 122 which connects the axial bore 94 with the periphery of the groove 92. A ball 124 is held in a groove 112 by a resilient lever 126. The resilient lever 126 surrounds the second piston means to cover the radial bore 122.

An indicator switch means 128 includes an electrically insulative body 130 which is attached to the housing 14. Body 130 has a shoulder 133 which engages stop 134. A disc 136 positioned on the end of the body 130 has an arm 138 which extends above an annular shoulder 140 on a plunger 142. The annular shoulder 140 engages the disc 136 and is resiliently biased into contact with lever 126. The body 130 has a cone shaped bore 132 and a cylindrical body 146. The cylindrical body 146 guides the plunger means 142 to maintain tangential contact with the lever 126. A spring 148 is attached to the end of the plunger 142. A contact 150 is attached to the body and is separated from spring 148 by a predetermined distance. This distance will vary but is usually about one-fourth of the depth of groove 112, and prevents destruction of the plastic body 130 if the resilient lever 126 pushes the plunger 142 down against the contact too far due to improper attachment of the body 130 to the housing 14.

The contact 150 is connected by lead 152 to indicator light 154 in the vehicle.

A flow control or proportioning means 28 located in the second chamber 34 has a proportioning piston 156 with a large diameter 158 and a small diameter 160. The large diameter 158 of piston 156 is located in a corresponding large diameter 162 of a bore 166 and the small diameter 160 of piston 156 is located in a small diameter 164 of the bore 166. A passage 168 extends through the third piston 156 and communicates the second chamber 34 with a distribution chamber 170. The distribution chamber 170 is connected to the outlet port 172 which is communicated to the rear wheel brakes 26 through passage 174 and groove 176. The small diameter section 160 of the piston 156 has a shoulder 178 on the end thereof for retention of a washer means 180.

The washer means 180 has a disc 182 which fits on the shoulder 178 and extends into a guide surface 184 on the plug means 52. A spring 186 is caged between the disc 182 and a retainer 190. The retainer 190 is attached to the end of the plug means 52. The spring 186 urges the third piston 156 away from the second piston means 86.

A poppet means 192 has a retainer 194 which is located between the end of the plug means 52 and the sleeve means 30. The retainer 194 has a plurality of peripheral openings 196 therein and a central opening 198. A stem 200 located in central opening 198 has a face 202 on the end thereof and a base 204. A spring 206 located between the retainer 194 and the face 202 holds the base 204 against the retainer 194.

MODE OF OPERATION OF THE PREFERRED EMBODIMENT

When the operator applies an input force to pedal 58, push rod 60 moves the first piston means 56 to close the compensator port 68 and begin to build up a first hydraulic pressure in the first chamber 32. The hold-off means 22 prevents this initial first hydraulic pressure from being communicated to the front wheel brakes 20, but the first hydraulic pressure acts on the end of the second piston means 86, and the first hydraulic pressure with spring 74 moves the second piston 86 in bore 48 of the sleeve means 30 to develop a second hydraulic fluid pressure in the second chamber 34. This second hydraulic fluid pressure is communicated through passage 168 in the proportioning piston 156 for distribution to the rear wheel brakes 26. When the second hydraulic fluid pressure has brought the friction pads 301 against the brake drums of the rear wheel brakes 26, the hold-off means 22 allows the hydraulic fluid pressure developed in the first chamber 32 to be communicated to the front wheel brakes 20. At a predetermined pressure level the second hydraulic fluid pressure in the second chamber acting on the face of the large diameter 158 of the proportioning piston 156 overcomes spring 186 and moves seat 206 toward the face 202 of the poppet means 192 to proportionally reduce the second hydraulic fluid pressure communicated to the rear wheel brakes 26. At some predetermined pressure, seat 208 is urged against face 202 to interrupt the communication through passage 168. Thereafter, any further increase in the second hydraulic fluid pressure acts on the face of small diameter 160 of the third piston 156 to move seat 208 away from face 202 and allow a proportional amount of the increase to be communicated to the rear wheel brakes 26.

The first and second hydraulic fluid pressures developed in chambers 32 and 34 are communicated to opposite ends of the shuttle piston means 106. As long as these hydraulic fluid pressures are equal, the shuttle piston means 106 remain stationary in bore 94. However, should a failure or malfunction occur in the first hydraulic fluid pressure distribution system, the second hydraulic fluid pressure acts on chamfered end 210 of the sleeve means 30 to overcome the return spring 74 and move disc 76 against shoulder 84. At the same time, spring 212 urges retainer 194 and the sleeve means 30 away from seat 208. Movement of face 202 away from seat 208 allows free communication between chamber 34 and the outlet chamber 170. At the same time, this second hydraulic fluid pressure acts on face 120 of the shuttle piston means 106 to move groove 112 out of alignment with the radial bore 122. Ball 124 follows the contour of the shuttle valve means 106 to move lever 126 away from groove 92 and, therefore, to move plunger 142 in the cylindrical bore 146. When plunger 142 moves, shoulder 140 moves disc 136 into the cone-shaped bore causing arm 138 to pivot on the end of body 130. As the plunger approaches its maximum movement, arm 138 contacts both housing 14 and the plunger 142 to close an electrical circuit to permit battery 220 to actuate light 154. Thus, an operator is informed of a malfunction condition in the master cylinder 12.

Upon termination of the input force to pedal 58, return spring 74 moves the first piston means 56 against stop 78. However, the shuttle piston means 106 remains in its actuated position and continues to hold ball 124 against the lever and sustain the failure indication signal. Later, when the malfunction is corrected, the first hydraulic fluid pressure developed in the first chamber 32 is communicated into the reset chamber 116 and acts on band 118 to move the shuttle piston 106 into a position where ball 124 is repositioned in groove 112.

The embodiment as illustrated in FIG. 2, of FIGS. 2 and 3 illustrates a different type of shuttle piston means 106. In this embodiment, the second piston means 86 has a groove 112 between first land 88 and the second land 90 of the piston means 106. The second piston means 86 has a first radial bore 304 and a second radial bore 306 which connects the axial bore 94 with the peripheral surface of the groove 112. The shuttle piston means 106 has a first groove 300 separated from a second groove 302 by a land 308.

The indicator means 128 has a lever 310 with a first projection 312 and a second projection 314 located in the first and second radial bores in the second piston means 86. The lever 310 is retained in a slotted retainer 318, see FIG. 3, to guide the lever 310 as it is moved by the shuttle piston. The plunger 142 is resiliently biased against the lever 310 by a spring to hold the projections 312 and 314 against the grooves in the shuttle piston means 106.

As long as the first and second hydraulic fluid pressures remain substantially equal, the shuttle piston means 106 remains stationary. To illustrate the operation of the indicator, assume a malfunction has occurred in the rear distribution system. The first hydraulic fluid pressure acts on face 114 to move the shuttle piston means 106 toward stop 320. As the shuttle piston means 106 moves, projections 312 and 314 will follow the contour of the shuttle piston means 106, to move lever 310 as lands 308 and 309 are moved in line with the radial bores 304 and 306, respectively. As before, in describing the embodiment of FIG. 1, the indicator means 128 remains in the activated position until substantially equal pressure is presented to the shuttle piston means 106 to recenter the grooves 300 and 302 with respect to the first and second radial bores 304 and 306, respectively.

I claim:
1. A fluid motor for use in a vehicle braking system having a first hydraulic system connected to the front wheel brakes and a second hydraulic system connected to the rear wheel brakes comprising:
a housing having a bore therein with a shoulder between a first diameter and a second diameter, said first diameter and said second diameter being connected to a reservoir through a first compensator port and a second compensator port, respectively, said first diameter being connected to said front wheel brakes and said second diameter being connected to said rear wheel brakes;
first piston means located in said first diameter for generating a first hydraulic fluid pressure for distribution to the front wheel brakes;
sleeve means located in said second diameter of said bore having a groove on the peripheral surface aligned with said second compensator port, said sleeve having a plurality of radial ports for connecting said reservoir to the interior of the sleeve through the groove;
plug means connected to said housing adjacent the sleeve means for sealing said bore from the atmosphere;
first resilient means located in said bore for holding said sleeve means against said plug means and said first piston means against a stop on the housing to create a gap between the end of the sleeve means and the shoulder in the bore;
second piston means located in the interior of said sleeve means for generating a second hydraulic fluid pressure for distribution to the rear wheel brakes;
linkage means for connecting said first piston means with said second piston means; and
flow control means positioned in said bore between said plug means and said sleeve means for regulating the communication of the second hydraulic fluid pressure to the rear brakes as a function of the first hydraulic fluid pressure communicated to the front wheel brakes, said second hydraulic fluid pressure moving said sleeve means against said shoulder in opposition to said first resilient means to eliminate said gap when a differential pressure occurs between the first and second hydraulic pressures and means for moving a portion of said flow control means in a direction away from said plug means when said differential pressure occurs to allow said second hydraulic fluid pressure to directly flow to said rear wheel brakes without being regulated by said flow control means.

2. The fluid motor, as recited in claim 1, wherein said second piston means includes:
a cylindrical body having an axial bore therein and a radial bore which connects the axial bore with the peripheral surface of the cylindrical body; and
shuttle means located in said axial bore having a first end subjected to said first hydraulic fluid and a second end subjected to said second hydraulic fluid, said first hydraulic fluid and second hydraulic fluid being adapted to center an actuation surface on the shuttle means in line with said radial bore.

3. The fluid motor, as recited in claim 2, further comprising:
indicator means attached to said housing and connected to said shuttle means for informing an operator that a pressure differential between the first and second hydraulic fluid pressures exists.

4. The fluid motor, as recited in claim 3, wherein said second piston means further includes:
a cap attached to the cylindrical body having a passageway therethrough for communicating the first hydraulic fluid pressure to the first end of the shuttle means, said cap being attached to said linkage means to allow said first resilient means to move the second piston means against an extension of the sleeve means when the first piston is urged against the stop on the housing.

5. The fluid motor, as recited in claim 3, wherein said indicator means includes:
ball means located in said radial bore;
lever means surrounding said cylindrical body to cover said radial bore and urge said ball means toward said actuation surface on the shuttle means, said ball means following the contour of the shuttle means when a pressure differential acts on the shuttle means and moves the actuation surface away from the radial bore to allow said lever means to correspondingly move and actuate the indicator means.

6. The fluid motor, as recited in claim 3, wherein said indicator means further includes:
bearing means attached to said housing having a cone-shaped bore connected to a cylindrical bore therein, said bearing means being made of an electrically insulative material;
plunger means located in said cylindrical bore of the bearing means, said plunger means having an annular shoulder adjacent a first end thereof which engages said lever means and a second end;
disc means positioned on the end of the bearing means, said disc means engaging the annular shoulder on the plunger means, said disc means having an arm which extends above said annular shoulder; and
spring means located in said cylindrical bore adjacent the second end of the plunger, said plunger means moving in response to movement of said lever means to bring said spring means into contact with a connector attached to a display, said disc means upon movement of said plunger moving into said cone-shaped bore in the bearing means causing the arm thereon to pivot on the end of the bearing and provide an electrical ground between said housing and the plunger means to complete an electrical circuit with said display.

7. The fluid motor, as recited in claim 6, wherein said flow control means includes:
proportioning means having a proportioning piston with a first diameter section and a second diameter section located in a corresponding first diameter section and a second diameter section of a distribution bore in said plug means, said first diameter section of the plug means being larger than the second diameter section, a cylindrical bore in said proportioning piston for communicating said second hydraulic fluid pressure to said first diameter section of the plug means which in turn is connected by a passage to an outlet port in the housing connected to the rear wheel brakes, said second diameter of the proportioning piston having a shoulder on the end thereof;
washer means attached to the shoulder on the second diameter of the proportioning piston; and
second resilient means fixed to the end of the plug means and acting on the washer means to hold the first diameter section of the proportioning piston against the end of the first diameter section of the plug means, said second hydraulic pressure acting on the first diameter of the piston to move the washer means toward the second piston means to allow the communication of the second hydraulic fluid pressure to the rear wheel brakes to be proportionally reduced as a function of the area of the first diameter section to the second diameter section.

8. The fluid motor, as recited in claim 7, wherein said portion of said flow control means includes:
poppet means having a retainer located between the plug means and the sleeve means, said retainer having a plurality of openings therethrough to permit the free communication of the second hydraulic fluid into the cylindrical bore and a central opening in axial alignment with said cylindrical bore, said poppet means having a stem with a face on one end and a base on the other end, said poppet means having a third resilient means located between said retainer and said face for urging the face toward a seat surrounding the cylindrical bore of the proportioning piston to restrict the communications of the second hydraulic fluid through the cylindrical bore as the proportioning piston moves toward the second piston means.

9. The fluid motor, as recited in claim 8, wherein said flow control means further includes:
fourth resilient means located between said washer means and said retainer means of the poppet means for moving said face away from the seat surrounding the cylindrical bore of the proportioning piston when the sleeve means is moved against said shoulder between the first diameter and the second diameter in the bore of the housing.

10. The fluid motor as recited in claim 1, wherein said second piston means includes:
a cylindrical body having an axial bore therein with a first radial bore and a second radial bore connecting the axial bore with the peripheral surface of the cylindrical body; and
shuttle means located in said axial bore having a first end subjected to said first hydraulic fluid and a second end subjected to said second hydraulic fluid, said shuttle means having a first groove adjacent the first end and a second groove adjacent the second end, said first and second hydraulic fluids acting on said first and second ends, respectively, to position said first groove in line with said first radial bore and said second groove in line with the second radial bore.

11. The fluid motor, as recited in claim 10, further including:
indicator means attached to said housing and connected to said shuttle means for informing an operator that a pressure differential between the first and second hydraulic fluid pressures exists.

12. The fluid motor, as recited in claim 11, wherein said indicator means includes:
a slotted guide attached to said shuttle means having openings therein corresponding to said first radial bore and said second radial bore;
a lever located in said slotted guide having a first projection which extends through said first radial bore, and a second projection which extends through said second radial bore;
plunger means resiliently biased against said lever for urging the first and second projections toward the first and second grooves; and
display means having a contact in alignment with said plunger means, said lever upon movement of the shuttle means in response to the pressure differential being moved as the first and second projections follow the contour of the shuttle means to move the plunger means into engagement with the contact in order that an electrical circuit may be completed and the display activated.

* * * * *